April 20, 1965 R. W. ANKNEY Re. 25,765

CAN CLOSURES

Original Filed Oct. 29, 1956 2 Sheets-Sheet 1

INVENTOR.
ROBERT W. ANKNEY
BY Alfred C. Body
ATTORNEY

INVENTOR.
ROBERT W. ANKNEY
BY Alfred C. Body
ATTORNEY

United States Patent Office

Re. 25,765
Reissued Apr. 20, 1965

25,765
CAN CLOSURES

Robert W. Ankney, Cuyahoga County, Ohio
(8007 Grand Ave., Cleveland, Ohio)

Original No. 2,923,446, dated Feb. 2, 1960, Ser. No. 618,955, Oct. 29, 1956. Application for reissue Aug. 14, 1961, Ser. No. 134,039
10 Claims. (Cl. 222—569)

Figure 1:
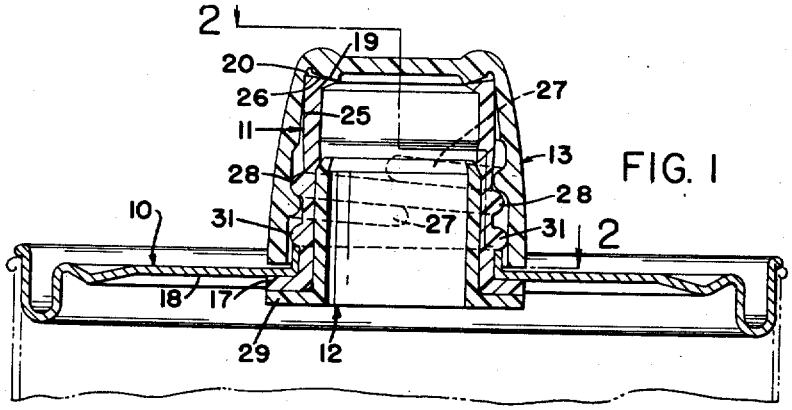

Matter enclosed in heavy brackets [ ] appears in the original patent but forms no part of this reissue specification; matter printed in italics indicates the additions made by reissue.

The present invention pertains to the art of can closures or more particularly to a can closure including a pouring spout.

The invention is particularly applicable to pouring spouts and closures for cans made of sheet metal materials and will be described with particular reference thereto although it will be appreciated that the can may be of any desired material.

Ordinarily cans of the type which are used for containing liquid soaps, detergents and many other liquids are generally constructed from sheet materials such, for example, plastic or sheet metal including ferrous sheet metal. The sheet material used in these cans is generally very thin and, therefore, unless it is reinforced, provides a weak connection or joint between the sheet material and a pouring spout or enclosure secured thereto at a hole in the wall.

It is known to manufacture the pouring spouts out of a relatively soft, pliable material such as a polyethylene molded plastic. By pliable is meant a material which can readily be deflected or deformed by relatively light pressures such as hand pressure and which, upon the release of the pressure, will quickly regain its molded shape. These spouts were provided on the outside thereof with threads for co-acting with an internally threaded cap.

One of the problems in the past has been to mount such a plastic spout on a metal can wall in such manner that a leakproof, sealed joint is obtained and the spout will remain tight to and thus substantially nonmovable relative to the wall even though the spout and wall of the can are subjected to extreme temperature changes or destructive type bending, or other forces or pressures.

Another problem was to eliminate molding costs of the square-type thread by using semicircular or V-type threads or a sloping edge cam portion on the spout and cap while having a thinner wall thickness to provide a larger opening for a given external spout diameter. It is recognized that semicircular, V-type threads or sloping edge cam portions make it possible to use a single piece die for molding since the spout and cap can be stripped therefrom, whereas the square threads required a two-piece separable die for molding. Also, materials and curing time are saved when a thinner wall thickness can be used.

The problem of filling the cans was also encountered because of the small opening in the spout and the attachment of the spout to the wall prior to filling of the can. Filling the can through a larger opening in the spout or attaching the spout to the wall after filling the can is more economical and easier to do.

Furthermore, when sheet metal is used, it usually has coatings of tin or other material on the surfaces thereof to prevent corrosion, rusting, or the like, of the sheet metal. However, when a hole is punched in the sheet metal, the edge of the hole is left unprotected and sometimes was left in a position where it could easily be contacted by the atmosphere or the corrosive materials or liquids in the can. Various attempts have been made to protect the peripheral edge of the hole against corrosion when such spouts and/or closures are secured thereto.

The present invention contemplates a new and improved pouring spout of a general type described which overcomes all of the above referred difficulties and others, and provides a cap and pouring spout which is simple in construction, economical to manufacture, is leakproof and easily assembled with a can wall either before or after attaching the wall to the can and either before or after filling the can.

The present invention further contemplates a can closure and pouring spout which is constructed from a plastic material and is secured to the periphery of the hole in a sheet metal can in such manner that it strengthens the can and spout as well as protecting the peripheral edge of the hole against corrosion.

In accordance with the present invention, a sheet material can is provided with a cylindrical flange defining a hole in the wall of the can. Extending through this hole is a pliable tube or spout held against the flange by a rigid sleeve which presses the tube against the flange. The spout may be secured in the flange or on the wall before or after the wall is fastened to the rest of the can as well as before or after the can has been filled. The tube or spout is closed by a removable cap which may engage external cam or thread portions of the tube and which sealingly seats against at least a corner on the end of the tube. Since the tube is pliable, it has been found preferable to make the rigid sleeve sufficiently long so that it forms a liner for the threaded portion of the spout or tube to stiffen it.

Further in accordance with the invention, the pouring spout is externally threaded or provided with cam portions of a shape which can be easily stripped from a mold without parting the mold.

Further in accordance with the invention and when the sheet material of the can is corrodible or sheet metal, the tube is preferably provided with a shoulder or the like which will cover and protect the edge of the flange around the hole.

Therefore, the present invention as set forth herein has for one of its objects the provision of a pouring spout for a can which is simple in design, economical to make, easy to assemble, and provides a strong construction.

A further object of the invention is to provide a combined closure and spout for a sheet material can which completely seals the can and protects the peripheral edge of the sheet material around the spout.

A further object of the invention is to provide a pouring spout for a can which is assembled to the wall of the cam after the can is completed.

A further object of the invention is to provide a sheet material wall of a can with a pliable pouring spout and a cap which completely seal the hole in the can when the cap is affixed to the spout, wherein the spout is reinforced or stiffened and the cap is cammed or threaded thereon.

A still further object of the invention is to provide a mounting for a pouring spout on the sheet material wall of the can wherein a sealed joint is obtained which is mechanically strong or which strengthens the wall of the can.

A still further object of the invention is to provide complementary structures in a pouring spout and a cap therefor which completely seal the pouring spout when the cap is affixed thereto, the pouring spout being made of a pliable material.

Figure 2:
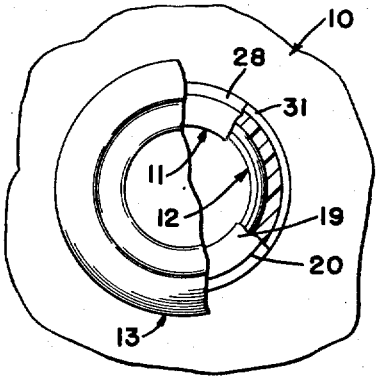
Figure 3:
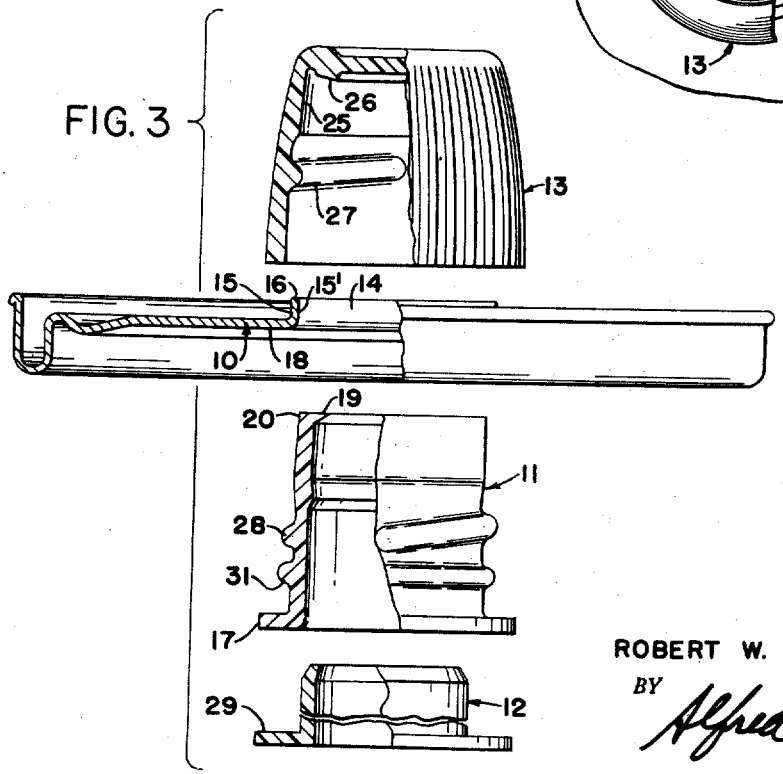
Figure 4:
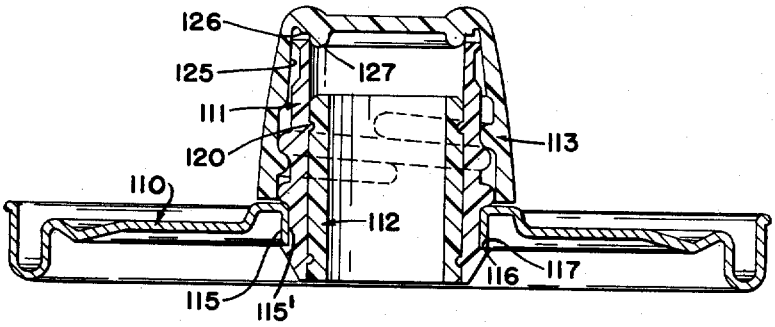
Figure 5:
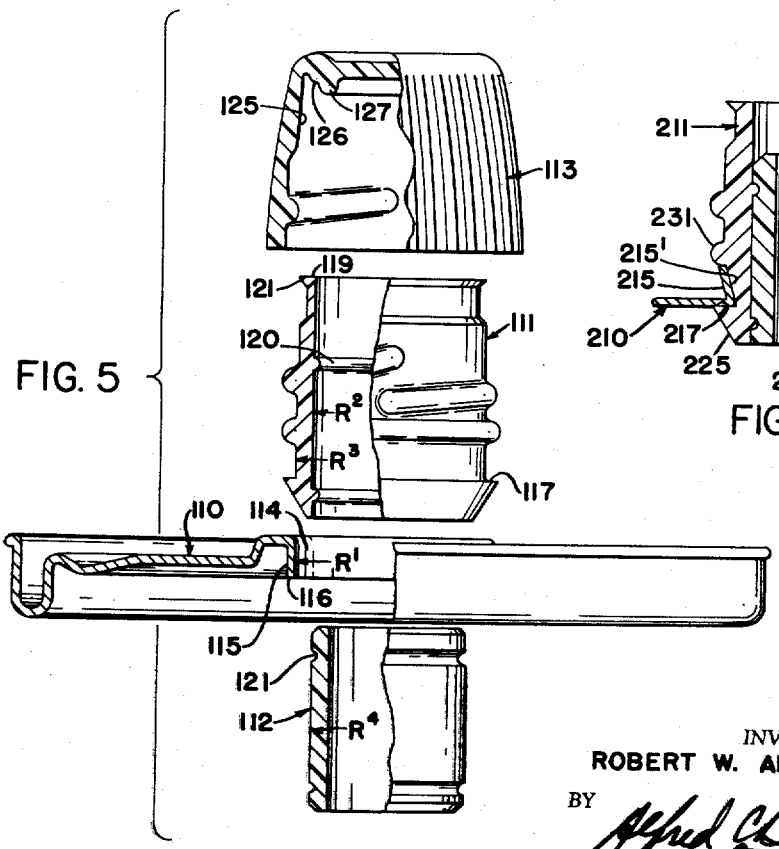
Figure 6:
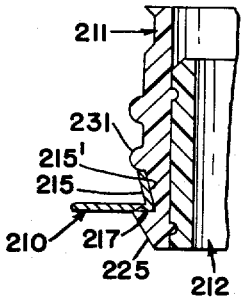

Further objects of the invention will become apparent from the claims when taken in conjunction with the folowing description of particular embodiments of the in-
'ention in association with the drawings in which:

FIGURE 1 is a cross-sectional view of a section of a
heet material wall of the can and the pouring spout
nd cap attached thereto and in sealed engagement there-
/ith, illustrating an embodiment of the invention, FIGURE 2 is a view taken approximately along the
nes 2—2 of FIGURE 1, FIGURE 3 is an exploded view of the component parts
f FIGURE 1 illustrating the invention with the parts
ıereof illustrated partly in cross-section, FIGURE 4 is a cross-sectional view of another embodi-
ıent of the invention, FIGURE 5 is an exploded view of the embodiment
f FIGURE 4, and FIGURE 6 illustrates another modification of the in-
ention.

Referring to the drawings wherein embodiments of the
ıvention are shown for the purposes of illustrating the
ıvention and not for the purpose of limiting same, the
gures show a can and closure therefor, comprised of
sheet material can wall 10, a pliable tube constitut-
ıg the pouring spout 11, a non-resilient or rigid sleeve
2, and a cap 13 which may be somewhat resilient if de-
red. The wall is provided with a flange 15, defining a
ole 14 through which the spout or tube extends and to
hich the tube is secured by the rigid sleeve tightly fitted
ithin and radially outwardly pressing the tube. The
ıp is threaded, cammed or otherwise fitted on the free
ıd of the tube to completely seal it and is removable
ıerefrom so that contents of the cam may be poured out-
ardly through the tube or spout. In most instances, it
preferable to have the rigid sleeve stiffen that por-
on of the spout which is in threaded engagement with
e cap.

The term "out-turned" flange as used herein refers to
e fact that the flange extends transversely to the wall
'ound it, and regardless of whether the flange extends
a general direction into or out of a completed can.

In the structure of FIGURE 1, the wall 10 is formed of
sheet material such as a ferrous sheet metal having
tinned or corrosion-proof surface coating applied there-
by plating or the like, and provided with a hole 14.
ıe pouring spout 11, rigid sleeve 12, and cap 13 are,
this case, made from suitable plastic materials as will
ıreinafter be more fully described.

The wall 10 (see FIGURE 3) has an out-turned flange
terminating in an unprotected edge 16, with the out-
rned flange 15 defining the periphery of the hole 14
the sheet metal wall 10. This edge 16 is usually un-
otected by the tinning, plating or other coatings which
e applied to the surface of the sheet metal in the wall
since the hole is usually punched therein after the
atings are applied to the sheet metal forming the wall.
ıe out-turned flange naturally strengthens the periphery
the sheet metal around the hole 14.

The resilient, flexible or pliable tube 11 extends through
flange 15 and thus through the hole 14 and is pro-
led with a collar 17 on one end thereof which is adapt-
to seat tightly against the inside surface 18 of the
eet metal wall 10 of the can. The tube or spout 11
s a longitudinal passage therethrough. In accordance
th the present invention, the portion of the tube or
out 11 which is received in the opening 14 has, before
insertion in such opening, outer dimensions at least
ıal to the dimensions of the opening, so that the spout
a snug fit in this opening when initially inserted there- The longitudinal passage in the tube or spout
after such insertion has pre-determined dimensions
gitudinally uniform throughout the length of the open-
14 and for a substantial distance beyond. The tube
is preferably made of a somewhat resilient, flexible
pliable plastic material such as, for example, poly-
ylene, so that it can be resiliently or flexibly pushed
sealed surface contact with the inside surface 15' of the out-turned flange 15 and the inside surface 18 of the wall by the non-resilient or rigid sleeve 12 which tightly fits into the inside of the sleeve 11 and within the out-turned flange 15. The sleeve 12 is inserted in the longitudinal passage in the spout 11 after the spout has been positioned in the opening 14. The sleeve has outer dimensions longitudinally uniform throughout the length of the opening 14 and greater than the pre-determined uniform dimensions at the portion of the spout 11 which is located in the opening 14, but less than the dimensions of the opening 14 itself. By virtue of this novel structural arrangement, when the sleeve 12 is inserted into the spout passage after the spout has been inserted in the opening 14, the material of the portion of the spout at the opening 14 will be compressed between the sleeve and the flange 15 which defines the opening 14.

The tube or spout 11 extends outwardly from the wall and thus from the out-turned flange 15 and terminates in an inturned lip 19 at the free end thereof which is engageable by the cap 13. The inturned lip 19, and thus the free end of the resilient tube 11, is surrounded by and peripherally encompassed by an external sharp corner or edge 20 adapted to cooperate with cap 13 to provide a seal when cap 13 is on the spout.

The cap 13 is provided with an internal wall surface 25 terminating in an internal peripheral bottom surface 26 which cooperate with the corner 20 and the lip 19 of the tube to completely seal the end of the tube when the cap is cammed or threaded thereon. In this instance, it has been found preferable to have the wall surface 25 and the bottom surface 26 aligned in such manner that the wall surface 25 is slightly conical upwardly and the bottom surface 26 slopes inwardly and downwardly toward the inturned lip 19 on the end of the tube 11. In this way, the wall surface 25 will engage and press the sharp corner 20 radially inwardly and the bottom surface 26 will engage and press against the inturned lip 19 to completely seal the end of the tube 11 when the cap 13 is fastened thereon.

The cap 13 is fastened to the tube 11 with the surface 25 in sealing engagement with sharp corner 20 and with surface 26 in sealing engagement with lip 19 by providing the cap 13 with an internal cam portion such as threads 27 and the outside of the tube 11, between the ends thereof, with a complementary cam portion such as threads 28. In the present instance, these cooperative cam portions or threads 27 and 28 may be molded into the tube and the cap during the manufacture thereof.

The threads or the cam portions are of a semicircular V-shape, or the like which will permit stripping the spout or cap from a mold. In view of this, a mold may be constructed of a single piece of material instead of separable pieces which are necessary when the spout or cap cannot be stripped from the mold. Also, the spout or tube 11 is of thinner wall section than prior designs so that a larger opening is attained for a given outside diameter spout.

The tube 11, being of a flexible or pliable material, is made rigid in the threaded portion by means of the rigid sleeve 12 so that good thread or cam engagement is obtained between tube 11 and cap 13. Rigid sleeve 12 has a length sufficient to line the inside of and thereby strengthen or stiffen the threads of tube 11 as well as hold tube 11 in sealed engagement with the out-turned flange 15. Thus, rigid sleeve 12 extends from a point between the inturned lip 19 and the threads 28, through the flange 15 and terminates in a flange 29 which covers and seats against collar 17 on the inside of the can.

Rigid sleeve 12 is made of a material which will not be corroded by the contents of the can, such, for example and preferably, rigid non-corrosive plastic materials. It is understood that if non-corrosive materials are contained in the can, this sleeve 12 may be made of metal.

With this construction and the sealing engagements herein provided, the hole in the wall of the cam is completely sealed when the cap 13 is placed tightly on the tube 11 to press edge or corner 20 into cap surface 25 and lip 19 into cap surface 26, and sleeve 12 presses spout or tube 11 against the out-turned flange 15.

The seal is not broken by attempting to push the spout sideways or axially relative to the wall of the can or when the can is subjected to extreme temperatures. Even though the spout and metal wall of the can have different co-efficients of expansion, the present design assures a strong, leakproof joint at various temperatures so that movement of the spout relative to the wall is not obtained when the cap is placed thereon or when other moving forces are applied thereto.

It is noted that this construction completely isolates the edge 16 of the outturned flange 15 from the contents of the can. The edge is completely on the outside of the tube or spout 11 and on the outside of the can.

Corrosion of this edge 16 is further prevented by providing the tube 11 with an external resilient shoulder 31 which seats against the edge 16 to cover it. When the cap is removed from the spout during pouring of liquids therefrom, the shoulder 31 covers the edge 16 to keep contents being poured from the can from coming in contact with the edge 16.

The modification of the invention, illustrated in FIGURES 4 and 5, has a sheet material can wall 110, a pouring spout 111, a rigid sleeve 112, and a cap 113 which are in many respects similar to those of FIGURES 1 to 3 and which provide a spout and seal for the can.

In this modification, the wall 110 has an out-turned flange 115 defining hole 114. It is understood the flange 115 may extend in either direction from the wall and is illustrated as extending from the wall towards the inside of the can whereas in the modification of FIGURE 1, the out-turned flange 15 extends outwardly from the can. The flange 115 terminates in an unprotected edge 116.

The pliable tube or spout 111 has one end thereof chamfered and provided with an external shoulder 117 seatable against the edge 116 with the spout extending through the hole 114 and flange 115. Since the end is chamfered, the spout may be pushed through the flange, shoulder end first, for assembly purposes and the shoulder 117 will snap out over the edge 116. The spout 111 is pressed radially outwardly against the inside wall 115' of the flange 115 and held in engagement therewith by the rigid sleeve 112.

The rigid sleeve 112, in this instance, is a straight hollow cylindrical sleeve with at least one end, and preferably both ends, externally chamfered to permit pressing the sleeve 112 into the spout 111 and within the flange 115. When both ends of the rigid sleeve are chamfered, either end may be inserted first into the spout. The sleeve and spout may also be provided with suitable interlocking portions, such as bead 120 and groove 121, to prevent easy removal of the sleeve after the spout has been assembled to the flange.

The sleeve 112 may have a length sufficient to hold the spout 111 against the flange 115 or, preferably and as illustrated, may have a length sufficient to line and thereby stiffen the threaded portion of the spout. When the sleeve 112 lines the threaded portion of the spout, the cap may be threaded down tight without collapsing the pliable spout.

Such structure, whether used in the modifications of FIGURE 1 or 4, also permits molding the spout of a pliable material whereby the threads can be formed in a rounded corner manner and still be stripped from a cavity type mold. It is well known that if the threads were square threads and the spout were made of a non-pliable or non-flexible material, an integrated separable mold would be needed.

It is noted that in both modifications, the flange 15 or 115 has an internal diameter $R^1$, the spout 11 or 111 has a pre-assembled internal diameter $R^2$, and a pre-assembled external diameter $R^3$, and the rigid sleeve 12 or 112 has an external diameter $R^4$. These diameters are measured before assembly of the parts and at those portions which will be aligned within the flange after assembly. A strong, rigid supporting structure which is sealed and does not leak is obtained when the pre-assembled dimensions are in one of the following relationships:

(*a*) When $R^3$ is equal to $R^1$, $R^2$ is less than $R^4$.

(*b*) When $R^3$ is greater than $R^1$, $R^2$ is equal to or less than $R^4$.

With these pre-assembly dimensions, the rigid sleeve 12 or 112 will radially outwardly press the pliable or flexible spout 11 or 111 into or against the inside 15' or 115' of the flange 15 or 115, thus forming a sealed, tight and strong mounting of the spout on the wall 10 or 110.

In assembling the device of FIGURE 4, the sleeve 112 may be pressed into tube 111 either before or after the tube is inserted in flange 115 and from either end of the tube. For example, and in the preferred method, the rigid sleeve 112 may first be placed in the free end, the end opposite shoulder 117, of the spout 111 and then the spout 111 pressed into the flange 115. After this, the sleeve 112 is pressed on into the spout 111 and within the flange 115, the bead 120 and groove 121 interlocking to prevent the parts from separating.

This preferred method of assembly permits manufacture of the can complete with the wall and flange, the flange extending outwardly from the wall but in a direction into the completed can. The can may then be filled with liquid or other contents prior to the insertion of the spout. After the can is thus filled, the spout may be secured in the flange and the cap cammed or screwed thereon to completely seal the can. It is understood that the spout may be inserted before the wall is secured to the remainder of the can or just before the can is filled with liquid or other contents if desired.

FIGURE 4 also shows a modification of the sealing arrangement between the end of the spout 111 and the cap 113. In this modification, an internal corner 119 and an external lip 121 are provided on the spout, the external peripheral lip 121 forming one shoulder of a peripheral groove in the outside of the spout 111. Such structure permits use of a cap having an inwardly tapering wall 125 next adjacent a bottom surface 126, and an annular bead 127 on the bottom surface. The wall 125 engages the lip 121 and the bead 127 engages the corner 119 to seal the cap and spout.

It is also understood that the spout and sleeve arrangement of FIGURE 4 may be used with the flange and wall of FIGURE 1, or the spout and sleeve arrangement of FIGURE 1 may be used with the flange and wall of FIGURE 4. However, in such cases slight alterations in the shoulder and collar will be necessary to cover the edge of the flange.

A further modification of the invention is illustrated in FIGURE 6. In this modification, can wall 210 supports pliable tube or spout 211 which is held in tight and sealed engagement therewith by means of non-resilient or stiff sleeve 212. As in the other preferred embodiments the can wall 210 is provided with a flange 215 engaged by the tube 211. The flange 215 may be extended at an angle of other than 90° to the wall 210, or as illustrated, the flange extends outwardly and somewhat back over the wall to provide a tapered opening or hole therethrough. The tube 211 is provided with a tapered surface adapted to engage the tapered inside surface 215' of the flange 215 and is provided with a shoulder 23 to engage the edge of the flange to cover that edge. The tube 211 is also provided with a shoulder 217 to engage the inside surface of the wall 210 around the flange 215. This shoulder or surface 217 is formed by chamfering c ıpering the end of the tube 211, thus providing the tube 11 with a chamfered surface 225.

In this modification of FIGURE 6, the tube or spout ay be inserted easily from the outside of the can 210 ven though the flange extends outwardly since the cham- red surface 225 will easily slide on the surface 215' when e tube is shoved through the flange. After the tube and e shoulder 217 thereof have been shoved through the ınge, the shoulder 217 snaps outwardly so that the ınge 215 is between the shoulder 217 and the shoulder 1. The rigid sleeve 212 is easily inserted in the tube 1 after the tube 211 has been shoved through the ınge to lock the tube 211 in the flange. With this odification, a leakproof seal is provided between the be and the flange and the wall 210, the same as in the her modifications of the invention as illustrated and scribed herein. The tube 211 may be provided with cam portion or threads and seal portions, the same as e other modifications, to co-operate with a cap, not ustrated in FIGURE 6.

It is noted in all of the embodiments that the pliable be forming the spout is held in leakproof engagement th the flange on the can wall by a non-resilient or rigid be so that a leakproof construction is obtained regard- s of the variations in temperatures or pressures to ıich the structure may be subjected. In each embodi- ent of the present invention the pouring spout has a ug fit in the can opening by virtue of the fact that, fore insertion of the spout, the outer dimensions of e portion of the spout which is located in the opening e at least equal to the dimensions of the opening itself. this portion of the spout the spout passage has pre- termined dimensions longitudinally uniform through- t the length of the can opening, at least The rigid eve has outer dimensions longitudinally uniform at st throughout the length of the can opening and greater ın said pre-determined dimensions of that portion of spout passage, but less than the dimensions of the can ening itself. In this way the material of this portion the spout is compressed between the sleeve and the ı surface which defines the opening. It is also noted all of the embodiments that a relatively thin walled e, or pliable spout, is provided which has thread or n portions adapted to be stripped from a mold and t these portions are prevented from collapsing by ans of the rigid liner sleeve. In this way, a cap may fixed on the tube or spout without collapsing the e or spout and with a leakproof seal between the can l the spout.

It will be appreciated that preferred forms only which invention may take have been illustrated and de- ibed in this specification. Obviously, modifications and erations differing radically in appearance from those ein described will occur to others on a reading and lerstanding of this specification. It is my intention to lude all such modifications and alterations insofar as y come within the scope of the appended claims.

Having thus described my invention, I claim:

[1. In the combination of a thin walled can having an ening therethrough defined by a surface, and a pour- spout of a pliant plastic material having a portion itioned within said opening and sealingly engaging said face, said portion having a longitudinal passage there- ough, the improvement which comprises: said por- ı before insertion in said opening having outer di- nsions generally at least equal to the dimensions of l opening, said passage after said portion is inserted said opening having predetermined dimensions longi- inally uniform at least for the length of said opening, l a rigid sleeve inserted in said passage after said por- ı is inserted in said opening, said sleeve having outer ıensions longitudinally uniform at least for the length said opening and greater than said passage predeter- ıed dimensions, but less than said opening dimensions, ereby when said sleeve is inserted into said passage after said portion is inserted in said opening, the material of said portion will be compressed between said sleeve and said opening surface.]

[2. The improvement of claim 1 wherein said spout has external threads, the passage inwardly of said threads has predetermined dimensions and said sleeve has a length such as to extend through said passage inwardly of said threads and having outer dimensions at least equal to the internal dimensions of said passage inwardly of said threads.]

[3. The improvement of claim 1 wherein said spout has outwardly extending beads, one on each longitudinal end of said portion spaced a longitudinal distance generally equal to the longitudinal length of said opening surface whereby said beads will engage the longitudinal ends of said surface when said spout is assembled in said open- ing.]

[4. The improvement of claim 1 wherein said passage has at least one inwardly extending bead spaced from said portion and said sleeve has at least one groove corresponding to said bead whereby when said sleeve is inserted in said passage, said groove and bead will match and assist in retaining said sleeve in said passage.]

[5. The improvement of claim 1 wherein said surface is on a flange extending longitudinally toward the outside of said can and said spout has a flange bearing against the inner side of said can and an outwardly extending bead engaging the outer end of said flange.]

[6. The improvement of claim 1 wherein said surface is on a flange extending longitudinally inwardly of said can and said spout has a pair of outwardly extending beads spaced longitudinally the length of said flange, the inner surface of said bead on the inner end of said spout converging inwardly whereby said spout may be inserted in said opening from the outside of said can.]

*7. An externally insertable spout for a metallic container having a rimmed circular opening therein, comprising in combination a resiliently deformable plastic nozzle having a tubular body with substantially non-tapering inner walls, one end having a circumferential groove defined by a pair of axially spaced apart shoulders having diameters greater than that of said circular opening, the shoulder next adjacent the extremity of said tubular body defining a flange capable of passing through said opening upon the application of deforming force, and the other end having a threaded portion adapted to receive and retain a cap; and a relatively stiffer hollow cylinder having non-tapering outer walls adapted to be telescopically received and frictionally retained within said nozzle and to prevent substantial deformation of the nozzle in the region of said flange.*

*8. An externally insertable spout for a metallic container having a rimmed circular opening therein, comprising in combination a resiliently deformable plastic nozzle having a tubular body with substantially non-tapering inner walls, one end having a circumferential groove defined by a pair of axially spaced apart shoulders having diameters greater than that of said circular opening, the shoulder next adjacent the extremity of said tubular body defining a flange capable of passing through said opening upon application of deforming force, said flange having an internal diameter less than that of the tubular body and defining an inwardly extending portion thereof; and the other end of said tubular body having a threaded portion adapted to receive and retain a cap; and a relatively stiffer hollow cylinder having non-tapering outer walls adapted to be telescopically received and frictionally retained within said nozzle and to prevent substantial deformation of the nozzle in the region of said flange.*

*9. An externally insertable spout for a metallic container having a rimmed circular opening therein, comprising in combination a resiliently deformable plastic nozzle having a tubular body with substantially non-tapering inner walls, one end having a circumferential*

*groove defined by a pair of axially spaced apart shoulders having diameters greater than that of said circular opening, the shoulder next adjacent the extremity of said tubular body defining a flange capable of passing through said opening upon application of deforming force, said flange having an internal diameter less than that of the tubular body and defining an inwardly extending portion thereof; and the other end of said tubular body having a threaded portion adapted to receive and retain a cap; and a relatively stiffer hollow cylinder adapted to be telescopically received and frictionally retained within said nozzle and to prevent substantial deformation of the nozzle in the region of said flange, said hollow cylinder further having a complementarily shaped portion adapted to engage and seat against the inwardly extending portion of said flange.*

*10. A spout in accordance with claim 7 in which the circumferential groove has an external diameter equal to the internal diameter of the rimmed circular opening.*

*11. In the combination of a thin walled can having an opening therein defined by a flange surface having a length greater than the thickness of the wall of said can, and a pouring spout of a pliant plastic material having a portion positioned within said opening and sealingly engaging said surface, said portion having a longitudinal passage therethrough, the improvement which comprises: said portion before insertion in said opening having outer dimensions generally at least equal to the dimensions of said opening, said passage after said portion is inserted in said opening having predetermined dimensions longitudinally uniform at least for the length of said flange surface, and a rigid sleeve inserted in said passage after said portion is inserted in said opening, said sleeve having outer dimensions longitudinally uniform at least for the length of said flange surface and greater than said passage predetermined dimensions, but less than said opening dimensions, whereby when said sleeve is inserted into said passage after said portion is inserted in said opening, the material of said portion will be compressed between said sleeve and said opening surface.*

*12. In the combination of a thin walled can having an opening therethrough defined by a surface, and a pouring spout of a pliant plastic material having a portion positioned within said opening and sealingly engaging said surface, said portion having a longitudinal passage therethrough, the improvement which comprises: said portion before insertion in said opening having outer dimensions generally at least equal to the dimensions of said opening, said passage after said portion is inserted in said opening having predetermined dimensions longitudinally uniform at least for the length of said opening, and a rigid sleeve inserted in said passage after said portion is inserted in said opening, said sleeve having outer dimensions longitudinally uniform at least for the length of said opening and greater than said passage predetermined dimensions, but less than said opening dimensions, whereby when said sleeve is inserted into said passage after said portion is inserted in said opening, the material of said portion will be compressed between said sleeve and said opening surface, said spout having external threads, the passage inwardly of said threads having predetermined dimensions and said sleeves having a length such as to extend through said passage inwardly of said threads and having outer dimensions at least equal to the internal dimensions of said passage inwardly of said threads.*

*13. In the combination of a thin walled can having an opening therein defined by a flange surface having a length greater than the thickness of the wall of said can, and a pouring spout of a pliant plastic material having a portion positioned within said opening and sealingly engaging said surface, said portion having a longitudinal passage therethrough, the improvement which comprises: said portion before insertion in said opening having outer dimensions generally at least equal to the dimensions of said opening, said passage after said portion is inserted in said opening having predetermined dimensions longitudinally uniform at least for the length of said flange surface, and a rigid sleeve inserted in said passage after said portion is inserted in said opening, said sleeve having outer dimensions longitudinally uniform at least for the length of said flange surface and greater than said passage predetermined dimensions, but less than said opening dimensions, whereby when said sleeve is inserted into said passage after said portion is inserted in said opening, the material of said portion will be compressed between said sleeve and said opening surface, said spout having outwardly extending beads, one on each longitudinal end of said portion spaced a longitutinal distance generally equal to the longitudinal length of said opening surface whereby said beads will engage the longitudinal ends of said surface when said spout is assembled in said opening.*

*14. In the combination of a thin walled can having an opening therethrough defined by a surface, and a pouring spout of a pliant plastic material having a portion positioned within said opening and sealingly engaging said surface, said portion having a longitudinal passage therethrough, the improvement which comprises: said portion before insertion in said opening having outer dimensions generally at least equal to the dimensions of said opening, said passage after said portion is inserted in said opening having predetermined dimensions longitudinally uniform at least for the length of said opening, and a rigid sleeve inserted in said passage after said portion is inserted in said opening, said sleeve having outer dimensions longitudinally uniform at least for the length of said opening and greater than said passage predetermined dimensions, but less than said opening dimensions, whereby when said sleeve is inserted into said passage after said portion is inserted in said opening, the material of said portion will be compressed between said sleeve and said opening surface, said passage having at least one inwardly extending bead spaced from said portion and said sleeve having at least one groove corresponding to said bead whereby when said sleeve is inserted into said passage, said groove and bead will match and assist in retaining said sleeve in said passage.*

*15. In the combination of a thin walled can having an opening therethrough defined by a surface, and a pouring spout of a pliant plastic material having a portion positioned within said opening and sealingly engaging said surface, said portion having a longitudinal passage therethrough, the improvement which comprises: said portion before insertion in said opening having outer dimensions generally at least equal to the dimensions of said opening, said passage after said portion is inserted in said opening having predetermined dimensions longitudinally uniform at least for the length of said opening, and a rigid sleeve inserted in said passage after said portion is inserted in said opening, said sleeve having outer dimensions longitudinally uniform at least for the length of said opening and greater than said passage predetermined dimensions, but less than said opening dimensions, whereby when said sleeve is inserted into said passage after said portion is inserted in said opening, the material of said portion will be compressed between said sleeve and said opening surface, said surface being on a flange extending longitudinally toward the outside of said can and said spout having a flange bearing against the inner side of said can and an outwardly extending bead engaging the outer end of said flange.*

*16. In the combination of a thin walled can having an opening therethrough defined by a surface, and a pouring spout of a pliant plastic material having a portion positioned within said opening and sealingly engaging said surface, said portion having a longitudinal passage therethrough, the improvement which comprises: said portion before insertion in said opening having outer dimensions generally at least equal to the dimensions of said open-*

*ng, said passage after said portion is inserted in said opening having predetermined dimensions longitudinally uniform at least for the length of said opening, and a rigid sleeve inserted in said passage after said portion is inserted in said opening, said sleeve having outer dimensions longitudinally uniform at least for the length of said opening and greater than said passage predetermined dimensions, but less than said opening dimensions, whereby when said sleeve is inserted into said passage after said portion is inserted in said opening, the material of said portion will be compressed between said sleeve and said opening surface, said passage being on a flange extending longitudinally inwardly of said can and said spout having a pair of outwardly extending beads spaced longitudinally the length of said flange, the inner surface of said bead on the inner end of said spout converging inwardly whereby said spout may be inserted in said opening from the outside of said can.*

References Cited by the Examiner

The following references, cited by the Examiner, are of record in the patented file of this patent or the original patent.

UNITED STATES PATENTS

| | | | |
|---|---|---|---|
| 1,137,248 | 4/15 | Whitney | 222—569 |
| 2,098,128 | 11/37 | Bailey | 222—498 |
| 2,314,315 | 3/43 | Scheele | 285—239 X |
| 2,723,060 | 11/55 | Rieke | 222—566 |
| 2,760,691 | 8/56 | Henchert | 222—566 |
| 2,819,001 | 1/58 | Pottle | 222—566 |

FOREIGN PATENTS

| | | |
|---|---|---|
| 202,955 | 8/56 | Australia. |

SAMUEL F. COLEMAN, *Primary Examiner.*

LOUIS J. DEMBO, LAVERNE D. GEIGER, *Examiners.*